United States Patent [19]

Isenberg

[11] Patent Number: 4,664,987
[45] Date of Patent: May 12, 1987

[54] FUEL CELL ARRANGEMENT
[75] Inventor: Arnold O. Isenberg, Forest Hills Boro, Pa.
[73] Assignee: Westinghouse Electric Corp., Pittsburgh, Pa.
[21] Appl. No.: 671,845
[22] Filed: Nov. 15, 1984
[51] Int. Cl.[4] ............................................. H01M 8/10
[52] U.S. Cl. ...................................... 429/31; 429/32; 429/34; 429/38
[58] Field of Search ...................... 429/31, 32, 34, 38, 429/39

[56] References Cited
U.S. PATENT DOCUMENTS
4,490,444 12/1984 Isenberg ................................ 429/31

Primary Examiner—Charles F. Lefevour
Attorney, Agent, or Firm—D. P. Cillo

[57] ABSTRACT

A fuel cell arrangement is provided wherein cylindrical cells of the solid oxide electrolyte type are arranged in planar arrays where the cells within a plane are parallel. Planes of cells are stacked with cells of adjacent planes perpendicular to one another. Air is provided to the interior of the cells through feed tubes which pass through a preheat chamber. Fuel is provided to the fuel cells through a channel in the center of the cell stack; the fuel then passes the exterior of the cells and combines with the oxygen-depleted air in the preheat chamber.

9 Claims, 3 Drawing Figures

FUEL CELL ARRANGEMENT

GOVERNMENT CONTRACT CLAUSE

The government of the United States of America has rights in this invention pursuant to Contract No. DE-ACO280-ET-17089, awarded by the U.S. Department of Energy.

CROSS-REFERENCE TO RELATED APPLICATION

Reference is made to the subject matter of copending application Ser. No. 323,641 now U.S. Pat. No. 4,490,444 by the present inventor, entitled "High Temperature Solid Electrolyte Fuel Cell Configuration and Interconnections", hereby incorporated by reference. The related application may be referred to for additional information on individual fuel cell structure and interconnections.

BACKGROUND OF THE INVENTION

Fuel cells of the high temperature, solid electrolyte type use thin layers of a solid electrolyte (~40 $\mu$m), primarily stabilized zirconia, to convert the chemical energy of unrefined fuels, such as carbon monoxide-hydrogen mixtures, into direct current electrical energy at temperatures at or above 800° C. Such temperatures are required to render the solid electrolyte sufficiently conductive to minimize ohmic losses.

Individual fuel cells produce between 0.5 volt and 1.0 volt requiring that many cells be interconnected in both series and parallel to obtain the desired output voltage and current. In addition, proper operation of a fuel cell assembly requires that reactants be separated in the cell in order not to harm the electrodes. Further, the incoming oxidant must be preheated to near operating temperature.

The fuel cell generator described in U.S. Pat. No. 4,395,468 presents a configuration that satisfies the above requirements. Using the method of cell interconnection disclosed in the above cross-referenced application Ser. No. 323,641 individual fuel cells are electrically connected in series and parallel along their lengths to reduce ohmic losses and obtain the desired output voltage and current. Fuel cell reactants are kept separated, not by hermetically sealing between cell electrode compartments, but by controlled pressure differences in such compartments, to allow spent oxidant and fuel to combine in a combustion chamber which also serves to preheat incoming oxidant within air feed tubes that reach into the tubular cells.

Certain drawbacks remain in the design of U.S. Pat. No. 4,395,468. Individual cells at the periphery of the generator cell stack are in contact with restricting walls of insulation or containment. Depending upon the closeness of contact, fuel can leak without undergoing electrochemical oxidation along cell to wall contact areas. Close tolerances, careful sizing, and proper insulation support must be considered to limit fuel leakage to a minimum along the interface.

Also in the U.S. Pat. No. 4,395,468 design electrical contacts are made from cell to cell along the tube axis. Should one cell fail to operate in a single string of cells, one would lose power of the whole string unless more cells are also parallel connected. Another possible drawback of this generator is the requirement that the fuel cells be straight and of close tolerance for reliable electrical connection and that mechanical bundle cohesiveness is determined by the mechanical strength of the electrical contact strip bonds along a string of tubes. As shown in FIG. 1, failures may occur either in the parallel direction 9, series direction 10 or diagonal direction 11 through the tube bundle.

Other arrangements of individual fuel cells have been disclosed in the prior art, but not arrangements of the annular type of cell. U.S. Pat. Nos. 3,717,506, 4,175,165 and 4,248,941 pertain to solid electrolyte fuel cells that comprise large numbers of stacked planar fuel cells. These designs use connected plates rather than annuluses to form the generator array.

SUMMARY OF THE INVENTION

An annular type fuel cell generator overcomes the above obstacles by arranging the annular fuel cells in a network of crossing cells that are at right angles to each other. Cells are located parallel to each other in a horizontal plane. Then the planes are vertically placed in alternating right angle positions. From the open end of the cells feed tubes emerge which extend from the cell through a first chamber acting as an air preheater combustion chamber and into a plenum to which air is supplied. The closed outside ends of the the tubular fuel cells form a second chamber to which fuel gas is supplied. This configuration maintains the sealess design concept of U.S. Pat. No. 4,895,468 which uses constant and controlled reactant flow to prevent chemical reactant interaction, before entering the air preheat-combustion chamber.

During operation fuel passes over the outer electrode of the fuel tube while the oxidant, air (oxygen), passes over the inner electrode of the cell with both reactants undergoing electrochemical consumption converting chemical energy into electrical energy. Remaining fuel and oxidant in the depleted gases combine in the preheater-combustion first chamber where they react by combusting, thereby heating the incoming air in the feed tubes.

A new tubular fuel cell stacking arrangement has the cells arranged in a square with air feed tubes normal to each face of the square. At the perimeter of the cell stack is the first chamber acting as an air preheater and a plenum to which air is supplied. While the fuel cells near the corners of the square arrangement extend about half the length of the square side, those near the center of the square are somewhat shorter forming the center duct in the middle of the fuel cell stack. This center duct forms the second chamber into which the fuel gas is fed.

In order to control fuel gas penetration into the fuel cell stack, selected cells may be of a shorter length to form a passage, or a passive tube of predetermined porosity can be placed in the passage left by the shorter cell.

Fuel cell generators of this type can be in a modular form with support columns at the corners in the first chamber and plenum and within the second chamber. Support beams span selected support columns at predetermined elevations. Means are provided for making intermediate electrical and gas connections.

DESCRIPTION OF THE PREFERRED EMBODIMENT

Figure 1:
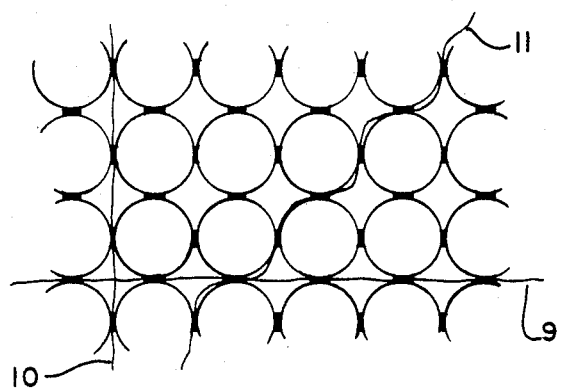
FIG. 1 is a cross-sectional view of the prior art.
Figure 2:
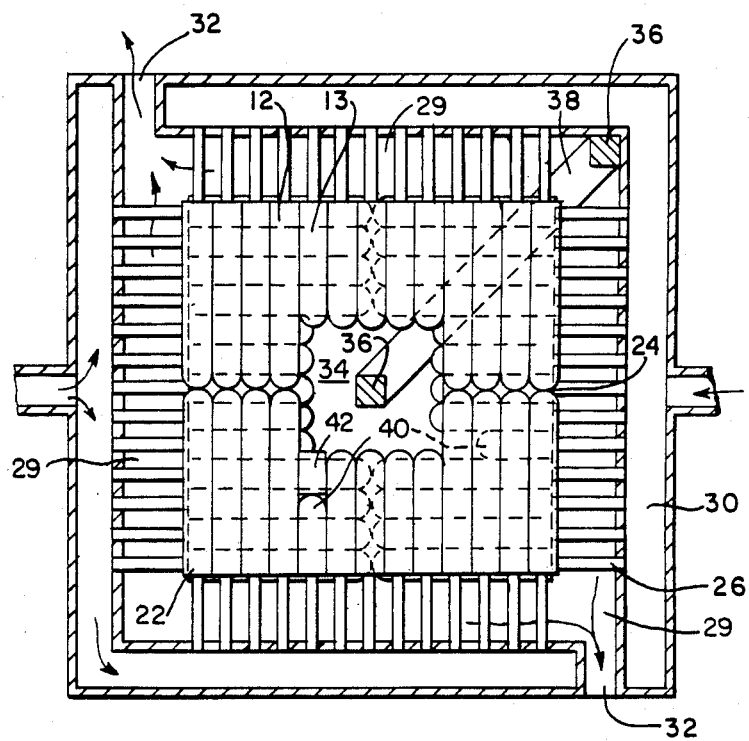
FIG. 2 is a plan view in section of the present invention illustrating the several features of the invention.

A better understanding of the present invention may be had by reference to the drawings. Referring to FIG. 2 an electrochemical cell configuration such as a fuel cell is shown having a plurality of high temperature, solid electrochemical annular cells 12 and 13 arranged in a planar network. In this network, cells are adjacent one another in a parallel fashion forming a plane. A multiplicity of such planes are sandwiched to form a stack of planes. Each plane of cells is rotated 90° with respect to the cell orientation against that of cells in the adjacent planes.

Figure 3:
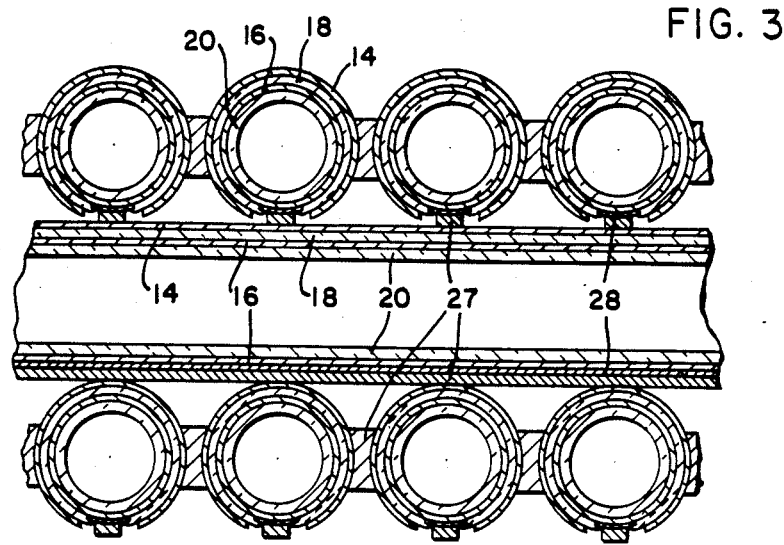
FIG. 3 is a sectional view of individual tubular fuel cells showing the individual electrical series and parallel connections.

Referring to FIG. 3, the solid electrolyte fuel cells have an outer annular electrode 14 and an inner annular electrode 16 between which is a solid electrolyte 18. A porous ceramic support tube of stablized zirconia 20 is located within the cell adjacent to the inner electrode and runs substantially the length of the cell.

Referring again to FIG. 2 each annular cell has an open end 22. The other end of each cell 24 is closed. The open end of the cell has a feed tube 26 that supplies one of the reactant gases into the interior of the support tube.

Two gases are supplied to the fuel cells, a first gas and a second gas. One gas is a fuel gas such as hydrogen or carbon monoxide and the other is an oxygen bearing gas such as air. The oxygen bearing gas must be heated to near operating temperatures ($\sim 800°$ C.) before reacting on the cells. The first gas is passed over the inner electrode of the cells via the feed tubes 26 and support tubes 20. The second gas is sent past the outer electrode 14 of the cells, that is the cell exterior wall, in a direction from the closed cell end to the open cell end. The porous support tubes 20 serve as channels through which the first gas flows. Air enters through the feed tube 26. The air flow reverses at the interior closed end of each cell and exits, depleted in oxygen, at the open cell end 22.

While the first and second gases are flowing in parallel with each other, they permeate the outer and inner electrodes respectively, electrochemically reacting, producing electrical current and heat. Typically the first gas is the oxygen bearing gas and the second gas is the fuel gas.

This arrangement eliminates leakage of unused fuel along generator boundaries and between cells. The friction between cross-linked cell tubes improves mechanical cohesiveness between cells while maintaining electrical contact at the intersection points of the generator lattice.

In order to effectively utilize the direct current produced by each cell at between approximately 0.5 volt and 1.0 volt, individual cells in the preferred embodiment are joined in parallel electrical connection within a cell plane and cell planes are electrically connected in series as shown in FIG. 3.

Electrical connections are made by contact means such as a metal fiber felt strip 27 joining cell electrodes. Series connections from the outer electrodes of cells in one plane to the inner electrode of cells is accomplished on the cell outside in the next plane with an electrically conductive interconnect 28 through a discontinuity of a selected angular segment in the cell's outer electrode and electrolyte as described in cross-referenced application Ser. No. 323,641. Contact from the outer electrode of one cell to the interconnect 28 of another cell is also made through a metal fiber felt strip 27.

The feed tubes which supply the air to the cell interior extend from the closed interior end of cells, then pass through a first chamber 29 and into a means for accepting the air, such as a plenum 30. The air is sent into the plenum 30 from where it flows through the feed tubes 26 and into the cells 12 and 13. In the first chamber 29 fuel exhaust depleted to 10% to 15% fuel and oxidant exhaust depleted to about 15% oxygen from the cells mix and react to completion by chemical combustion. This combustion contributes to pre-heating the incoming air that is passing through the feed tubes 26 before entering the cells 12 and 13. The combustion products then exit through the first chamber exhaust means 32.

A second chamber 34 is located about the closed ends of the cells and has an inlet port (not shown) for accepting the fuel gas. The fuel supplied to the second chamber is directed past the outer electrodes of the cells 12 and 13 where it is partially depleted, flows into the first chamber 29 where the remaining fuel is reacted with the oxygen depleted air and is then discharged.

The preferred arrangement is to have the open ends of the cells 22 and the feed tubes 26 extend outward toward the radial perimeter of the cell arrangement, preferably in a square column with the feed tubes extending normally from the four faces of the square column. The first chamber 29 then surrounds the cell configuration along the radial perimeter of the configuration.

In this preferred embodiment the second chamber 34 is located internal to the fuel cell configuration. The second chamber is preferably formed by having cells of two lengths. A first length 12 equal to about half the length of the side of the square columnar configuration and a second length 13 an amount shorter than the first length equal to half that desired for the length of a second chamber side.

Cells of the first length 12 are located near the corners of the square column arrangement, while the cells of the second length 13 are located near the edge centers forming the second chamber through the middle of the configuration. Feed tubes 26 are sized to achieve nearly equivalent pressure drops through different size cells.

Cells are stacked in the above described manner to a predetermined height to form a module. The module structure is defined by support means, such as vertical support members made of alumina 36 located at the corners of the module in either the first chamber 29 or plenum 30 and in the second chamber 34 and by support beams of alumina 38 spanning selected columns 36 at predetermined elevations. Ordinary electrical and mechanical connecting means are utilized to make electrical contact between modules where desired and to make gas connections between first chambers and second chambers of respective modules. The electrical power contacts to cells is made in a planar fashion, where a single connecting plate is in conducting contact to a cell plane or groups of connecting plates to a cell plant, which represents the positive terminal of a cell stack, the other, negative, electrical contact terminal is made in the same fashion from an opposing cell plane of a cell stack. U.S. Pat. No. 4,431,715, by the present inventor, teaches the means of electrical contacting of the cells. Modules are electrically coupled by making contact from the metal collector of the last plane of cells in one module to the metal collector of the first plane of cells in the next module.

Fuel gas is supplied to the second chamber from the top or bottom of the stacked modules. Air can be supplied from all sides of the stacked modules.

Fuel gas penetrating the cell network from the inside out has a flow rate that decreases. This promotes fuel consumption in the low current density areas of the stack periphery because of the longer residence time at the electrodes, while rich fuel gas flows more quickly through the high current density region near the center.

It is possible that fuel consumption may be nonuniform, especially along the fuel cell generator diagonals. However, since a uniform voltage is impressed on cells, the current will shift in such a way that fuel will tend to be consumed uniformly along the generator diagonals into the generator corners.

A generator modification can be made to promote uniform fuel consumption and uniform electrical output density throughout a cell module. Selected cells such as exemplary cell 40 are a ceratin amount shorter than the majority of the cells in that group to allow freer and deeper fuel penetration. The dispersion and amount of fuel flowing into the fuel stack as a result of the vacancy created by the shortened cells can be further controlled by the insertion of a similarly sized tube of predetermined porosity into the vacant space such as the tube 42.

I claim:

1. A high temperature, solid oxide electrochemical cell configuration comprising a plurality of annular cells, each cell having inner and outer annular electrodes with an electrolyte therebetween, said cells arranged in a network comprising planes of generally parallel cells adjacent one another with said planes positioned with planar surfaces adjacent one another and cells of said planes generally perpendicular to cells of adjacent planes,
   wherein said cells located in a common plane are in parallel electrical connection by having therebetween electrically conductive interconnects joining the outer electrodes of said cells, substantially along the length of said parallel adjacent cells, and
   wherein said cell planes perpendicular with respect to adjacent planes are in series electrical connection by having said outer electrode and said electrolyte of one cell contain discontinuities having therein electrically conductive interconnects along a selected angular segment of said inner electrode which is electrically connected to a selected axial segment of the outer electrode of another perpendicular cell.

2. The device of claim 1 wherein feed tubes extend into the interior of said cells through one end, the other end of said cells being closed, a first chamber located about the feed tubes, and the second chamber located about the closed end of said cells, said first chamber having means for accepting a first gas, part of which is sent to the inner electrode via the feed tubes and the remainder of said first gas is directed past the feed tubes to a first chamber exhaust means, said second chamber having an inlet port for accepting a second gas which is sent past the outer electrode and into the first chamber to mix and react with the first gas in the first chamber and exit through the first chamber exhaust means.

3. The device of claim 2 wherein said cells are arranged with said feed tubes extending from the cells' open ends outward from the cell configuration with said first chamber surrounding said cell configuration along the radial perimeter, and said second chamber located internal to said cell arrangement bounded by the closed end of said cells.

4. The device of claim 3 wherein said cells are arranged in a square column configuration with substantially an equal number of cells having feed tubes extending normally from each of the four faces of said square column and said cells are two lengths: a first length equal to approximately one-half the length of one side of said square column configuration, the cells of a first length located proximate the corners of said square column configuration, and cells of a second length, a predetermined amount shorter than those of said first length, said predetermined amount equal to one-half the length of one side of the square second chamber with cells of said second length located proximate the edge centers of said square column configuration, occupying the locations between cells of said first length.

5. The device of claim 3 wherein said cells are stacked to a predetermined height and are contained in a module comprising support column means located in said first chamber or plenum and within said second chamber, support beams spanning selected support column means at predetermined elevations, means for establishing electrical contact between modules, and means for forming connections between respective said first chambers and respective said second chamber of adjoining modules.

6. The device of claim 2 wherein selected cells are of a predetermined shorter length to allow deeper penetration of said second gas into the cell configuration.

7. The device of claim 6 wherein a tube of predetermined porosity occupies the vacant space created by said selected shortened cells.

8. The device of claim 1 wherein annular support tubes are located inside the inner electrodes.

9. A high temperature, solid oxide electrochemical cell configuration comprising a plurality of annular cells, each cell having inner and outer annular electrodes with an electrolyte therebetween, said cells arranged in a network comprising planes of generally parallel cells adjacent one another with said planes positioned with planar surfaces adjacent one another and cells of said planes generally perpendicular to cells of adjacent planes,
   wherein said cells located in a common plane are in series electrical connection by having said outer electrode and said electrolyte of one cell contain discontinuities having therein electrically conductive interconnects along a selected angular segment of said inner electrode which is electrically connected to the outer electrode of another cell substantially along the length of said cells, and
   wherein said cell planes perpendicular with respect to adjacent planes are in parallel electrical connection by having therebetween electrically conductive interconnects joining the outer electrode of said cell to a selected axial segment of the outer electrode of another, perpendicular cell.

* * * * *